Figure 1:
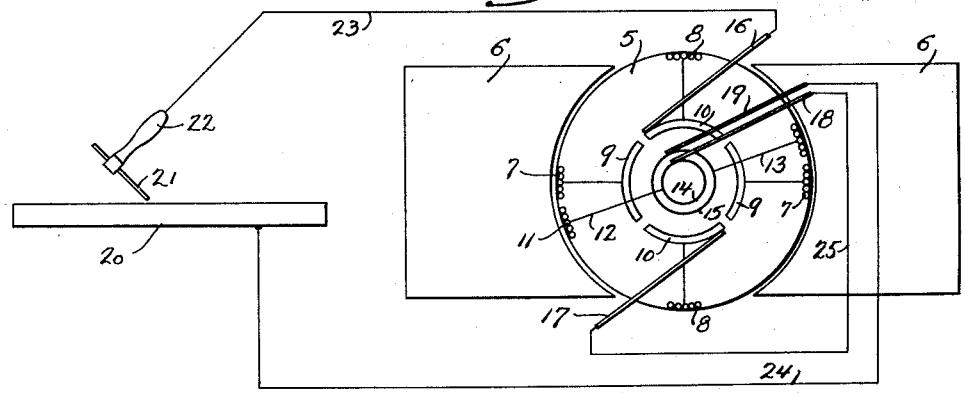

Dec. 6, 1938.  E. S. HEBELER  2,139,160

METHOD OF WELDING

Filed April 30, 1936  3 Sheets-Sheet 1

Inventor
EDWARD S. HEBELER
by J. W. M. Ellis
Attorney

Dec. 6, 1938.　　　E. S. HEBELER　　　2,139,160
METHOD OF WELDING
Filed April 30, 1936　　　3 Sheets-Sheet 2

Inventor
EDWARD S. HEBELER
by J. W. Ellis
Attorney.

Inventor
EDWARD S. HEBELER
by
Attorney.

Patented Dec. 6, 1938

2,139,160

UNITED STATES PATENT OFFICE 2,139,160

METHOD OF WELDING

Edward S. Hebeler, Williamsville, N. Y.

Application April 30, 1936, Serial No. 77,211

7 Claims. (Cl. 219—10)

My invention relates in general to a method of welding, and, in particular, to a method of welding by the use of an electric arc.

As is well known to those skilled in the art, direct current is preferred to alternating current in arc welding for the reason that a direct-current arc is more easily sustained and since, according to my invention, the voltage is only caused to pulsate and not to reverse itself, it has either a positive or negative value, and the operator, if subjected to a shock, would receive not more than one-half of that received from alternating current, thereby eliminating all protective devices necessary when using alternating current. The great drawback, however, to the use of direct current in arc welding is what is known as "magnetic blow" which does not occur to any detrimental degree when alternating current is used. This magnetic blow is caused by the magnetic flux which is built up in the air, in the work-piece, and around the arc by the use of direct current. This magnetic flux causes the arc to be deflected and blown to one side of the axis of the electrode. When welding in the corners of angles, this magnetic blow is very detrimental since the arc cannot be accurately directed into the corners. Under these conditions, it is not easy and sometimes impossible to apply the metal where it is desired, with the result that thoroughness of the weld is somewhat uncertain.

I have found that if the direct current supplied to the electrode is interrupted or if it is of a pulsating nature, (the degree of such pulsations being greater than those ordinarily produced in direct-current generators of conventional design) the magnetic flux surrounding the arc will not be able to build up to such a degree as will cause detrimental magnetic blow, it being obvious that the pulsations ordinarily encountered in direct-current generators of conventional design will not produce the desired results.

The principal object of my invention has been, therefore, to provide a method whereby the stability of the welding arc will be assured.

Moreover, my method enables the operator to use direct current and to derive therefrom all the advantages of such direct current and also, at the same time, to get all the advantages of alternating current.

Furthermore, by my method a stabilized arc is produced which makes it possible to use direct current in the welding of non-ferrous metals as well as any of the steel alloys.

The above advantages have been brought about by my method which may be carried out by a number of different kinds of apparatus, some of which, for illustrative purposes, have been shown in the drawings. It is obvious that while I have shown a number of ways of carrying out my method, apparatus other than that shown may be used.

As hereinbefore stated, my method may be carried out by the use of direct current which is either interrupted or of a pulsating nature.

In the drawings:

Fig. 1 shows in diagrammatic manner the prefered apparatus for carrying out my invention.

Figs. 2 to 7, inclusive, show, in a diagrammatic manner, other forms of apparatus for carrying out my invention, to be hereinafter described in detail.

The apparatus diagrammatically shown in Fig. 1 comprises a generator having a direct-current winding and an alternating-current winding. In Fig. 1, 5 represents the armature and 6 the pole pieces. The armature may be provided with two direct current coils 7 and 8, the ends of which are connected to the bars 9 and 10, respectively, of the commutator. The alternating-current winding 11 provided on the armature has its ends 12 and 13 connected to collector rings 14 and 15, respectively. Brushes for engagement with the commutator are diagrammatically indicated at 16 and 17, and brushes 18 and 19 are provided for the rings 14 and 15, respectively.

The work-piece is represented at 20 and the welding electrode at 21, said electrode being held as usual by means of a handle 22. As shown in the diagram, the electrode 21 is connected to the brush 16 by means of a lead 23, and the brush 18 is connected to the brush 17 by means of a lead 25. The brush 19 is connected to the work-piece 20 by means of a lead 24.

When the armature of this device is being rotated, it is obvious that the coils 7 and 8 will generate direct electromotive force which will be collected by the brushes 16 and 17. The coil 11, however, will generate an alternating electromotive force. During substantially 180° of rotation of the armature, this alternating electromotive force will flow in the same direction as the direct electromotive force, and the amount of the alternating electromotive force generated will be added to the direct electromotive force, since the direct-current coils and the alternating-current coils are connected in series. However, during each alternate 180° of rotation of the armature, the electromotive force generated in the alternating current coil 11 will flow in a direction opposite to the direction of flow of the direct electromotive force, with the result that this alternating electromotive force during these periods will oppose the direct electromotive force and serve to periodically reduce the direct electromotive force produced by the direct current coils 7 and 8, or to periodically stop the generation of direct electromotive force if the alternating electromotive force generated by the coil 11 is of the same amplitude as the direct electromotive force. Obviously, this will produce a pulsating or interrupted direct electromotive force.

Figure 2:
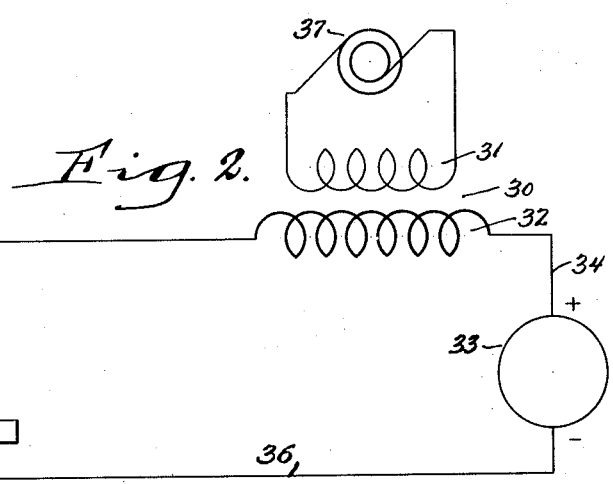

In the form of apparatus diagrammatically shown in Fig. 2, a pulsating or interrupted unidirectional current is produced by the use of a transformer 30. In this figure, the primary winding of the transformer is diagrammatically shown at 31, and the secondary winding thereof is indicated at 32. In this figure, like in all of the other figures, the work-piece is represented at 20, the electrode and electrode holder being represented at 21 and 22, respectively. In the apparatus shown in this figure the current is supplied from any direct current source, as, for instance, the generator represented at 33. The secondary winding 32 of the transformer is connected at one side to one side of the generator 33 by means of a lead 34, and the other side of this winding is connected to the electrode holder 22 by means of a lead 35. The work-piece 20 is connected to the other side of the generator 33 by means of a lead 36. The primary coil 31 of the transformer is energized by current from an alternating current source suitable for welding, as for instance, the alternating current generator 37 shown diagrammatically in this figure.

With such an arrangement as shown in Fig. 2, it will be obvious that direct current will be supplied to the electrode in the usual way. However, when the primary winding 31 of the transformer 30 is energized by alternating current, electromotive force will be induced in the secondary winding 32 of the transformer. When the induced current is flowing through the secondary winding 32 in the same direction as the flow of direct current in said winding, such induced current will amplify the direct current in the winding; but, when such induced alternating current is flowing in the opposite direction in the winding 32, the direct current will be opposed and will, therefore, be reduced or interrupted, whereby a pulsating or interrupted unidirectional current will be produced. Obviously, if the magnitude of the induced alternating electromotive force is of the same magnitude as the direct current being supplied to the welding electrode, then, during one-half of the cycle of the alternating current, the quantity of the direct current will be doubled, but during the other half of the alternating current cycle, the direct current will be reduced to zero. If, however, the magnitude of the alternating current is less than that of the direct current, then the direct current will be added to by the magnitude of the alternating current and it will be reduced only that amount which corresponds to the amplitude of the alternating current, whereby the electrode will be supplied with current which is pulsating but which is not interrupted.

Figure 3:
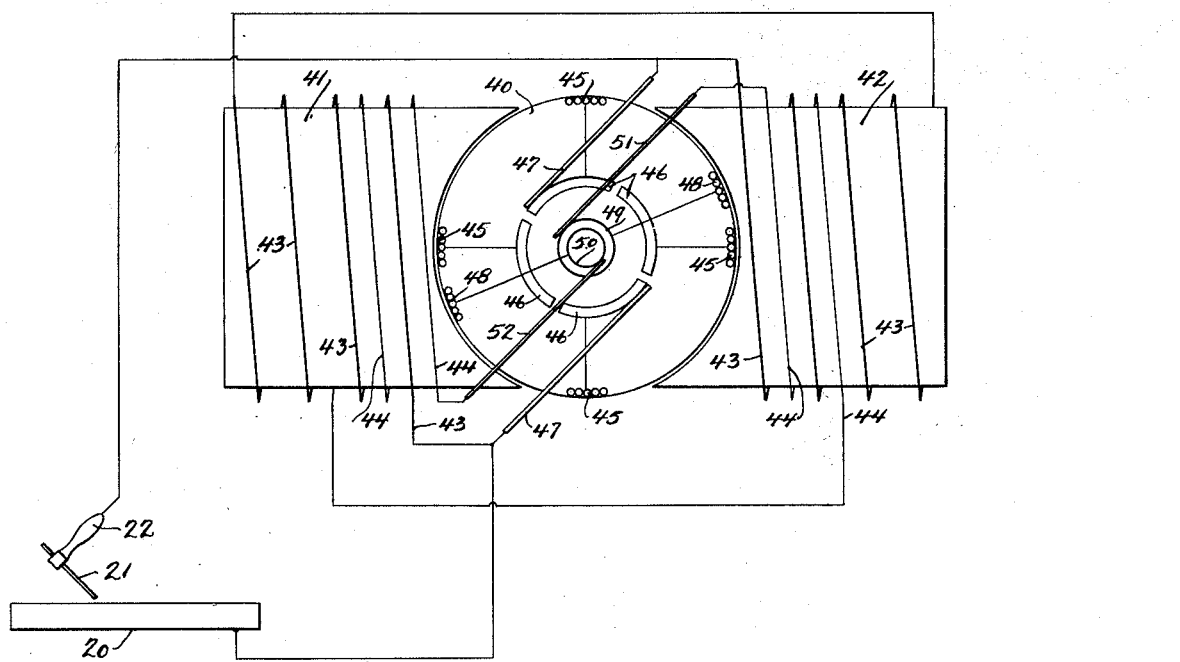

In Fig. 3, I show in diagrammatic manner another form of apparatus for carrying out my method by which direct electromotive force of a pulsating nature is generated. As here shown, 40 represents the armature of the generator, and 41 and 42 the pole pieces thereof. This generator is preferably of the shunt wound type and is provided with direct current field windings 43, and with alternating current field coils 44. The armature is provided with a number of direct current coils 45 which are connected in usual manner to commutator bars 46. Brushes 47, diagrammatically shown, engage with the commutator bars, whereby direct current may be taken off from the coils 45. In addition to direct current coils 45, an alternating current coil 48 is provided on the armature, and the ends of this coil are connected to collector rings 49 and 50. A brush 51 is in contact with the ring 49 and a brush 52 is likewise in contact with the ring 50. The alternating current coil 48 is connected by means of the brushes 51 and 52 in parallel with the alternating current field windings 44 of the generator, as shown in this figure.

From the foregoing, it will be obvious that the pole pieces 41 and 42 will be energized by the direct current coming from the brushes 47 and passing through the field coils 43. However, the alternating current generated by the alternating current coil 48 is flowing, during one-half of the cycle, through the brushes 51 and 52 to the field coils 44 in the same direction as the direction of flow of the direct current flowing in the coils 43. This momentary unidirectional flow of current during this one-half cycle will cause additional magnetic flux to be set up in the pole pieces and thus increase the amount of electromotive force generated. When, however, electromotive force is generated in the alternating current coil 48 during the other half of the cycle, the current coming from this coil will be flowing in the field coils 44 in the opposite direction, and the magnetic flux produced thereby will oppose the flux produced by the coils 43. During this half of the alternating current cycle, the direct electromotive force generated in the coils 45 will be reduced or interrupted, whereby the current supplied to the electrode will be either of a pulsating or interrupted unidirectional nature, depending upon the amplitude of the alternating current generated in the coil 48.

Instead of producing a pulsating unidirectional or interrupted welding current by superimposing an alternating current upon the direct current used for welding, the direct current may be generated in such a manner as to be of a pulsating character. Such forms of apparatus are shown in Figs. 4 and 5.

Figure 4:
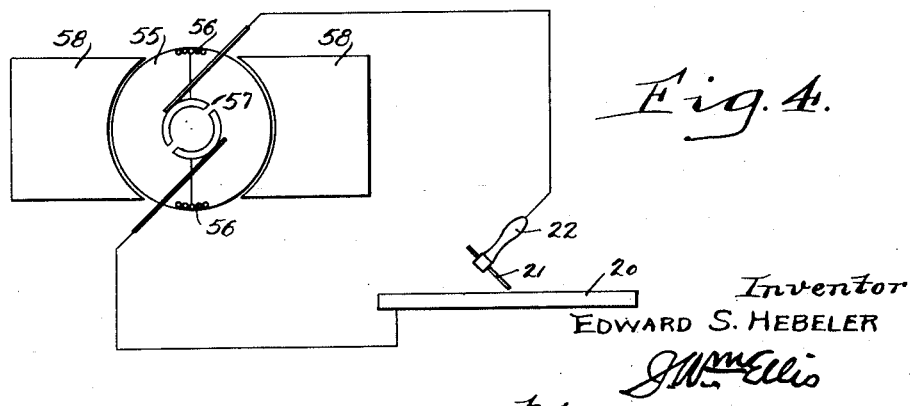

The generator represented in diagrammatic manner in Fig. 4 comprises an armature 55 having a winding 56 suitably connected to the commutator 57. The pole pieces 58 in this form of generator are narrower than the diameter of the armature, whereby the winding thereof will be beyond the influence of the strong magnetic flux flowing between the pole pieces during a part of the revolution of the armature. This will cause considerable fluctuation in the electromotive force generated.

Figure 5:
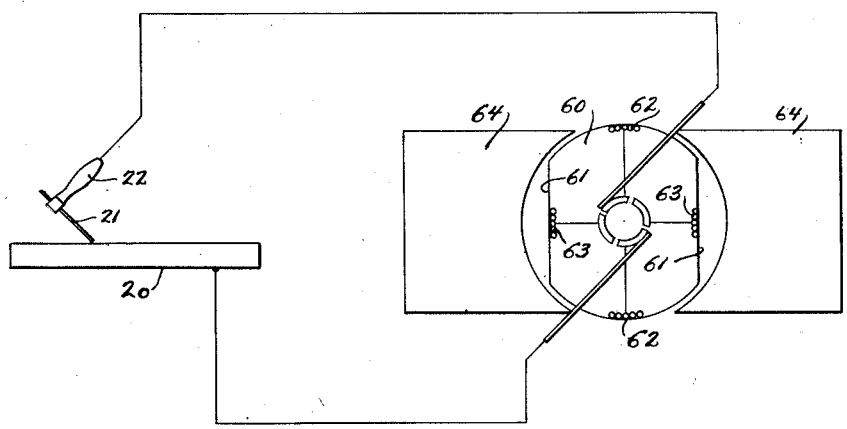

The form of apparatus shown in Fig. 5 has an armature 60 having two oppositely arranged flat sides 61 and armature windings 62 and 63 are provided. The pole pieces of this generator are represented at 64. It will be obvious that when the armature is in the position where the flat sides 61 are opposite the pole pieces 64, as shown in this figure, the air gap between the armature and pole pieces is greatly increased with the result that the current generated by the coil 63 will be very much less in magnitude than that generated by coil 62, thereby producing a unidirectional current of a pulsating nature.

Figure 6:
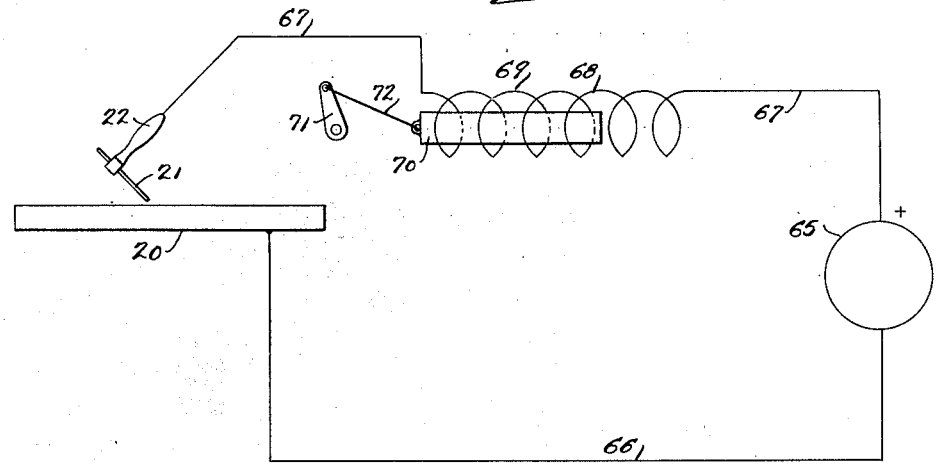

Another method of producing a pulsating direct current is to insert a solenoid, having a movable core, in the welding circuit. Such a form of apparatus is shown in Fig. 6 where 65 is a direct-current generator, one side of which is connected to the work-piece 20 by means of a lead 66. The other side of the generator is connected to the electrode and electrode holder 21 and 22, respectively, by means of the leads 67. Inserted in the lead 67 is the coil 68 of a solenoid 69. The solenoid is provided with a movable core 70 which is connected to a constantly rotating crank 71 by means of a link 72. As the core 70 is reciprocated back and forth into and out of the winding 68, the current flowing through the leads 67 will be caused to fluctuate, thus giving a pulsating unidirectional flow of current to the electrode.

Figure 7:
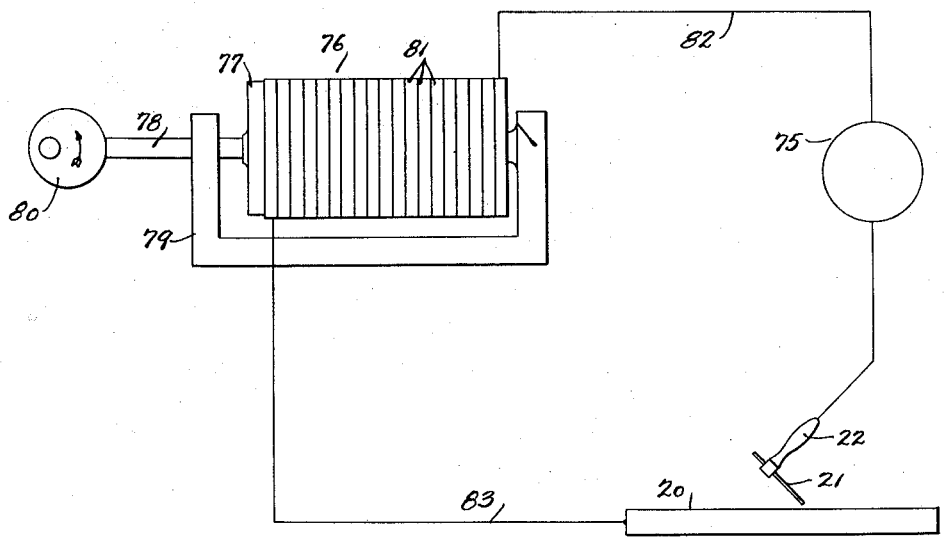

Another way of producing a pulsating direct current is to insert a periodically operated variable resistance element in the welding circuit. Such a form of apparatus is shown in Fig. 7 where 75 is the generator and 76 is a carbon pile, both diagrammatically represented. Arranged at the forward end of the carbon pile is a flange 77. This flange is carried by a rod 78 which is slidably mounted in the housing 79 of the carbon pile. A rotatably mounted eccentric 80 is brought to bear against the forward end of the rod 78 which causes the carbon discs 81 of the pile to be alternately pressed together and released, which has the well known effect of increasing and reducing the resistance. As shown in this figure, the lead 82 connects the disc at the end of the pile which is opposite to the flange 77 (which end is insulated from the housing 79) to one side of the generator 75, the other side of the pile being connected to the work-piece 20 by means of a lead 83 which may be connected to the flange 77, to the first member of the pile, (as shown) or to the housing 79. If connected to the latter, it is obvious that the disc at one end of the pile will be insulated from the housing, as indicated above.

In carrying out my method by any of the forms of apparatus shown and described, it would be clear that the magnetic flux set up around the electrode and arc, in the air, and in the work-piece by the direct current, will be caused either to fluctuate or be interrupted by the pulsating unidirectional current or by the interrupted direct current being supplied to the electrode, thereby minimizing the magnetic blow. It will be clear that where I describe the generation of either a direct current or an alternating current, I mean a current of such nature as to be suitable for welding purposes, having preferably a relatively low voltage and capable of supplying high amperage. Wherever in the specification or claims, I use the term pulsating as applied to the current supplied to the welding electrode, or refer to such current as being amplified or reduced in value, I mean a current which is caused to pulsate or fluctuate a degree beyond that which is normally found, and is inherent in, direct-current generators and which fluctuations are therefore abnormal and are definitely produced in such current by my invention, as carried out by any one of the forms shown in the drawings, whereby a definite effect is produced in the flux surrounding the electrode and the welding arc.

Having thus described my invention, what I claim is:

1. In the welding of metals by direct-current electricity, a method of stabilizing the welding arc, which includes, as a step, creating and maintaining a continuous pulsating unidirectional flow of electricity through the welding electrode.

2. In the welding of metals by direct-current electricity, a method of stabilizing the welding arc comprising the establishment of an electric arc between the electrode and the work-piece, and periodically varying the amplitude of the current, flowing through the welding circuit, an amount which will vary the magnetic flux around the arc an amount sufficient to stabilize the arc.

3. In the welding of metals by direct-current electricity, a method of stabilizing the welding arc, comprising the establishment of an electric arc between the electrode and the workpiece by means of said direct-current electricity, thereby creating a unidirectional flow of magnetic flux around the welding arc, and periodically interrupting the flow of current through the welding circuit, thereby interrupting the flux around the arc and stabilizing the same.

4. In the welding of metals by direct-current electricity, a method of stabilizing the welding arc, comprising the generation of a direct current and the simultaneous generation of an alternating current suitable for welding, and periodically modifying the direct current by means of the alternating current.

5. In the welding of metals by direct-current electricity, a method of stabilizing the welding arc, comprising the generation of a direct current and the simultaneous generation of an alternating current suitable for welding, and alternately amplifying and reducing the flow of the direct current by means of the alternating current.

6. In the welding of metals by electricity, a method of stabilizing the welding arc, comprising the establishment of a flow of unidirectional welding current through the welding electrode, the arc, and the workpiece, and establishing a flow of alternating welding current, said alternating current cooperating with the unidirectional current, whereby during one-half of the alternating current cycle the alternating current will amplify said unidirectional current and during the other half of the alternating current cycle said alternating current will minimize said unidirectional current.

7. In the welding of metals by direct-current electricity, a method of stabilizing the welding arc, comprising the establishment of a flow of unidirectional current through the welding electrode, and causing said current to periodically fluctuate from a point of substantially zero value to its maximum value.

EDWARD S. HEBELER.